(12) United States Patent
Gallagher et al.

(10) Patent No.: US 11,586,724 B1
(45) Date of Patent: Feb. 21, 2023

(54) SYSTEM AND METHODS FOR AUTHENTICATING CONTENT

(71) Applicant: Authidote LLC, Fairfax Station, VA (US)

(72) Inventors: Michael Gallagher, Fairfax Station, VA (US); Vinay Kumar Thadem, Fairfax, VA (US)

(73) Assignee: Authidote LLC, Fairfax, VA (US)

( * ) Notice: Subject to any disclaimer, the term of this patent is extended or adjusted under 35 U.S.C. 154(b) by 242 days.

(21) Appl. No.: 16/927,584

(22) Filed: Jul. 13, 2020

Related U.S. Application Data

(60) Provisional application No. 62/913,621, filed on Oct. 10, 2019, provisional application No. 63/000,838, filed on Mar. 27, 2020.

(51) Int. Cl.
*G06F 21/51* (2013.01)
*G06F 21/54* (2013.01)
(Continued)

(52) U.S. Cl.
CPC .............. *G06F 21/51* (2013.01); *G06F 21/54* (2013.01); *G06N 20/00* (2019.01); *H04L 9/0643* (2013.01)

(58) Field of Classification Search
CPC ......... G06F 21/51; G06F 21/54; G06N 20/00; H04L 9/0643
See application file for complete search history.

(56) References Cited

U.S. PATENT DOCUMENTS

2008/0291999 A1  11/2008  Lerouge et al.
2010/0100725 A1*  4/2010  Ozzie ...................... G06F 21/43
                                                              713/155
(Continued)

FOREIGN PATENT DOCUMENTS

CA    2739313  A1 * 11/2011  ............. H04L 63/08
CN    103139204  A  *  6/2013  ........... G06F 21/316
(Continued)

OTHER PUBLICATIONS

Allibhai. "Detecting fake video needs to start with video authentication" from Hackernoon. Posted Oct. 18, 2018. (URL: https://hackernoon.com/detecting-fake-video-needs-to-start-with-video-authentication-224a988996ce).
(Continued)

*Primary Examiner* — Sher A Khan
(74) *Attorney, Agent, or Firm* — Beem Patent Law Firm

(57) ABSTRACT

The invention relates generally to the field of content authentication, and more particularly, to a system and methods for verifying the authenticity of content output to a user. In certain preferred embodiments, the content is verified by identifying the source data of the content, distributing the content, and authenticating the distributed content. Where the content has not been changed, the system may authenticate the content using a cryptographic hash. When minor changes to the content are made, the system may use a perceptual hash to authenticate the content. Further, the system may utilize machine learning algorithms to identify patterns between the same content in, for example, multiple formats and sizes. Advantageously, the content that is uploaded to the system may be used to train machine-learning models that the system may use to authenticate content that has been converted but unmanipulated.

15 Claims, 15 Drawing Sheets

(51) Int. Cl.
*H04L 9/06* (2006.01)
*G06N 20/00* (2019.01)

(56) References Cited

U.S. PATENT DOCUMENTS

| | | | | |
|---|---|---|---|---|
| 2011/0321133 | A1* | 12/2011 | Grieve | G06F 21/31 |
| | | | | 726/4 |
| 2013/0339277 | A1* | 12/2013 | Morgan | G06N 20/00 |
| | | | | 706/12 |
| 2014/0304786 | A1* | 10/2014 | Pei | H04L 63/0876 |
| | | | | 726/6 |
| 2014/0324741 | A1* | 10/2014 | Stewart | G06N 20/00 |
| | | | | 706/46 |
| 2015/0234796 | A1* | 8/2015 | Williams | G06F 40/143 |
| | | | | 715/229 |
| 2015/0324863 | A1* | 11/2015 | Pugh | G06Q 50/01 |
| | | | | 705/14.27 |
| 2016/0150124 | A1* | 5/2016 | Panda | G06F 3/1204 |
| | | | | 358/1.14 |
| 2017/0134162 | A1* | 5/2017 | Code | H04L 9/3236 |
| 2017/0177249 | A1 | 6/2017 | Kurilov et al. | |
| 2018/0052881 | A1 | 2/2018 | Arumugham et al. | |
| 2018/0152410 | A1* | 5/2018 | Jackson | H04L 51/224 |
| 2018/0267598 | A1* | 9/2018 | Pulivendula | G06F 9/4406 |
| 2019/0213462 | A1* | 7/2019 | McDonald | G06Q 10/0833 |
| 2020/0336907 | A1* | 10/2020 | Jain | H04W 12/104 |
| 2021/0209606 | A1* | 7/2021 | Herlands | G06F 21/32 |
| 2021/0343262 | A1* | 11/2021 | Zavesky | G10H 1/0058 |

FOREIGN PATENT DOCUMENTS

| | | | | |
|---|---|---|---|---|
| CN | 106303696 | A | | 1/2017 |
| CN | 108351932 | A * | 7/2018 | ........... G06F 21/316 |
| CN | 109246446 | A | | 1/2019 |
| CN | 105337946 | B * | 5/2019 | ............ G06F 21/31 |
| DE | 102008003364 | A1 | | 7/2009 |
| WO | 2014088401 | A1 | | 6/2014 |
| WO | WO-2018002620 | A1 * | 1/2018 | ............ G06F 21/31 |
| WO | WO-2018125265 | A1 * | 7/2018 | ......... G06F 16/9577 |

OTHER PUBLICATIONS

Schroepfer. "Creating a data set and a challenge for deepfakes" from Facebook Artificial Intelligence. Posted Sep. 5, 2019. (URL: https://ai.facebook.com/blog/deepfake-detection-challenge/).
Dufour et al. "Contributing Data to Deepfake Detection Research" from Google AI Blog. Posted Sep. 24, 2019. (URL: http://ai.googleblog.com/2019/09/contributing-data-to-deepfake-detection.html).
Libby. "This Bill Hader Deepfake Video is Amazing. It's Also Terrifying for Our Future" from Popular Mechanics. Posted Aug. 13, 2019. (URL: https://www.popularmechanics.com/technology/security/a28691128/deepfake-technology/).
Rouse. "deepfake (deep fake AI) definition" from What Is. (URL: https://whatis.techtarget.com/definition/deepfake).
"Free Online EXIF Viewer" from Get-Metadata. (URL: https://www.get-metadata.com/).
Hasan et al. "Combating Deepfake Videos Using Blockchain and Smart Contracts" from IEEE Access. Published Mar. 18, 2019.
Dittmann et al. GMD Report 41. "Multimedia and Security." Workshop at ACM Multimedia '98 from September 12-13, 2998.
Cole. There is No Tech Solution to Deepfakes. Aug. 14, 2018. Retrieved from Vice: https://www.vice.com/en_us/article/594qx5/there-is-no-tech-solution-to-deepfakes.
Harwell. Top AI researchers race to detect 'deepfake' videos: 'We are outgunned'. Jun. 12, 2019. Retrieved from Washington Post: https://www.washingtonpost.com/technology/2019/06/12/top-ai-researchers-race-detect-deepfake-videos-we-are-outgunned/.
Kahn. Facebook contest shows just how hard it is to detect deepfakes. Jun. 12, 2020. Retrieved from Fortune: https://fortune.com/2020/06/12/deepfake-detection-contest-facebook/.
Knight. Deepfakes aren't very good—nor are the tools to detect them. Jun. 26, 2020. Retrieved from arsTECHNICA https://arstechnica.com/information-technology/2020/06/deepfakes-arent-very-good-nor-are-the-tools-to-detect-them/?comments=1.

* cited by examiner

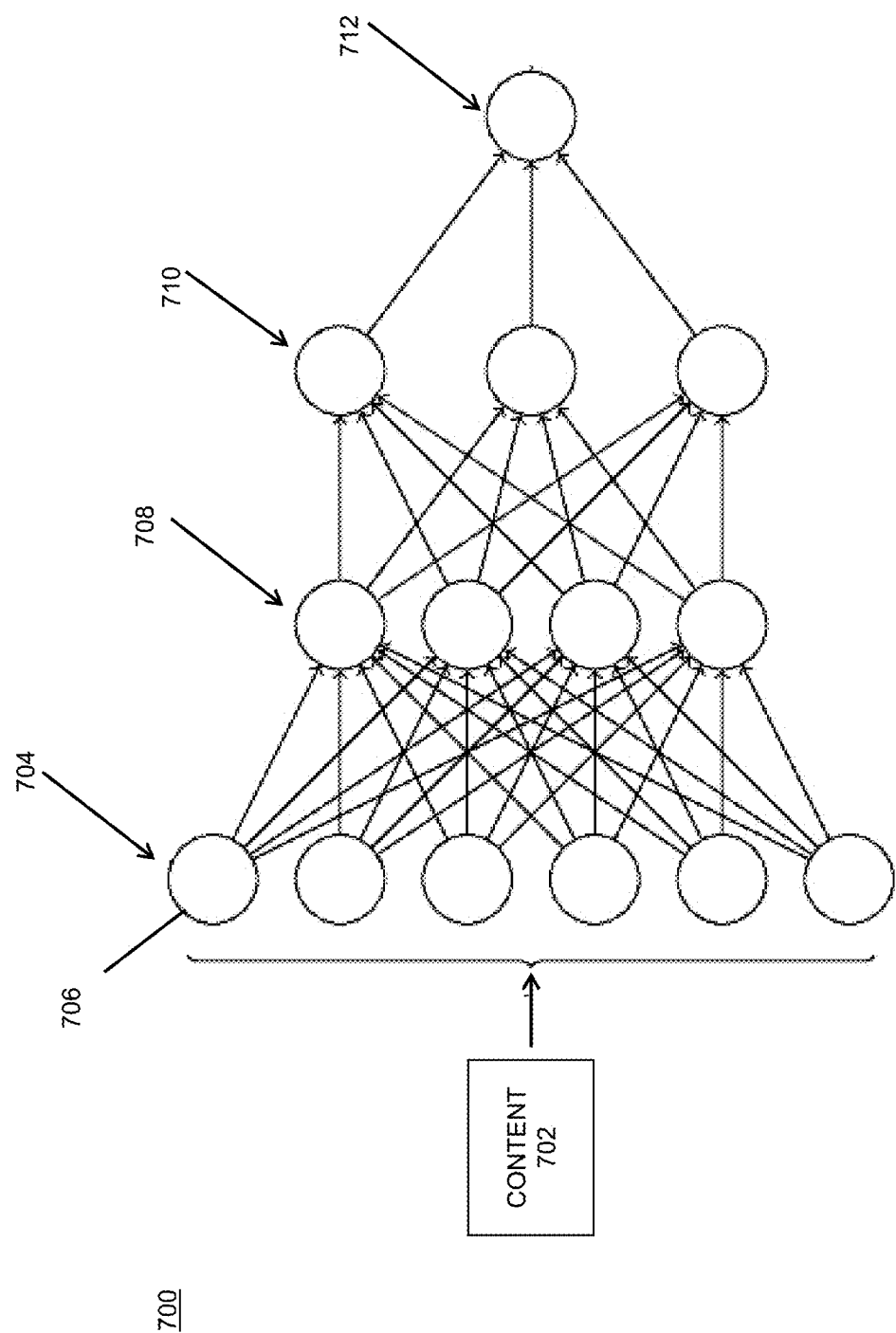

```
Vinays-MacBook-Pro:~ vinaykumarthadem$ curl -F "filename=@/Users/vinaykumarthadem/Desktop/Image.png" http://127.0.0.1:5000/media/verify_media
{
  "checksum": "2605c870a027b428708cade20e4b402a",
  "filename": "Image.png",
  "verified": "true",
  "verified_on": "Tue, 03 Mar 2020 15:28:47 GMT"
}
Vinays-MacBook-Pro:~ vinaykumarthadem$
```

FIG. 8C

```
Vinays-MacBook-Pro:~ vinaykumarthadem$ curl -F "filename=@/Users/vinaykumarthadem/Desktop/Image.png" http://127.0.0.1:5000/media/verify_media
{
  "checksum": "2605c870a027b428708cade20e4b402a",
  "filename": "Image.png",
  "verified": "true",
  "verified_on": "Tue, 03 Mar 2020 15:28:47 GMT"
}
Vinays-MacBook-Pro:~ vinaykumarthadem$ curl -F "filename=@/Users/vinaykumarthadem/Desktop/Image.png" http://127.0.0.1:5000/media/verify_media
{
  "verified": "false"
}
Vinays-MacBook-Pro:~ vinaykumarthadem$
```

SYSTEM AND METHODS FOR AUTHENTICATING CONTENT

CROSS-REFERENCE TO RELATED APPLICATIONS

This application claims benefit of U.S. Application No. 63/000,838 filed on Mar. 27, 2020 and U.S. Application No. 62/913,621 filed on Oct. 10, 2019, each of which is incorporated by reference in its entirety.

FIELD OF INVENTION

The invention relates generally to the field of content authentication, and more particularly, to a system and methods for verifying the authenticity of content.

BACKGROUND OF THE INVENTION

Modern technology has enabled information to be shared through various media platforms. A media platform may include a service, website, or method that delivers content. Examples of content may include audio, video, images, structured documents, and plain text.

The authenticity of content is a top priority for many organizations including government agencies. Content authentication may be used for various purposes, such as in political contexts, which often require suitable authentication to ensure that the content is genuine. The distribution of altered content may lead to a range of negative outcomes. For example, altering a video of a conversation between two world leaders may have consequences on a global scale.

One known technique for altering videos is referred to as deepfake. Deepfake videos are typically created via two competing artificial intelligence systems—one called the generator and the other called the discriminator. The generator may generate a fake video clip and then ask the discriminator to determine whether the clip is original or altered. Each time the discriminator identifies a video clip as being altered, it provides the generator with instructions about what not to do when creating the next modified clip.

The generator and discriminator together form a generative adversarial network (GAN). The first step in establishing a GAN is to identify the desired output and create a training dataset for the generator. Once the generator begins creating an acceptable level of output, video clips can be fed to the discriminator. As the generator improves at creating altered video clips, the discriminator gets better at distinguishing authentic videos from altered ones.

Because deepfakes are typically created through artificial intelligence, they don't require the considerable and varied skills that it takes to create an original video. Unfortunately, this means that just about anyone can create a deepfake to promote their chosen agenda. The inherent danger is that as deepfakes and other forms of altered content become more sophisticated and believable, people will have an increasingly more difficult time identifying original content from its altered spawn.

As a result of the danger associated with the distribution of deepfakes, the U.S. House of Representatives' Intelligence Committee has distributed letters to various social media platforms—including Twitter, Facebook, and Google—inquiring about their plans to combat altered content. The inquiry came in large part as a result of President Trump's tweet of a deepfake video of House Speaker Nancy Pelosi. Certain government institutions, such as DARPA, and researchers at colleges such as Carnegie Mellon, the University of Washington, Stanford University, and the Max Planck Institute for Informatics are also experimenting with deepfake technology. These organizations are attempting to learn more about the use of GAN technology and how to combat it.

Conventional ways for combating deepfake technology include the use of machine learning. By feeding algorithms with both deepfake and authentic videos, computers are configured to identify when content has been altered. There are several problems with this approach, however. First, this approach requires the accumulation and deployment of considerable resources, in terms of training content and computing assets. Second, machine-learning technology is still in its infancy, and thus the tools that are most widely accessible are unreliable. Third, some believe that a machine-learning solution will never be the answer. Most academic and industrial research into deepfakes, for example, is currently going into how to make them, not into how to defeat them, so the sophistication of techniques to create them must always be several steps ahead of machine-learning technologies' ability to detect and defeat them.

Hence, there is a need for a system and methods for verifying the authenticity of content output to a user through source comparison. The present invention satisfies this need.

SUMMARY

The present invention relates generally to the field of content authentication and, more particularly, to a system and methods for verifying the authenticity of content.

In certain preferred embodiments, the system is configured to verify content by identifying the source data of the content and authenticating the content, such as through the use of a cryptographic hash or a perceptual hash generated by processing content and through use of machine learning algorithms that facilitate identifying patterns between the same content in multiple formats and sizes. While video content is used for most of the examples in this application, other content is contemplated, such as audio, images, text, and documents.

For purposes of this application, a cryptographic or perceptual hash refers to a sequence of letters and/or characters of a fixed length. The cryptographic or perceptual hash may be an output of a hash function on a data file, such as video content. The system may use a standard library to generate the cryptographic or perceptual hash. It is also contemplated that the cryptographic or perceptual hash is generated according to a unique algorithm of the system.

To determine whether an authentic original file has been altered, such as through use of deepfake techniques, a hashing utility may be used to match the cryptographic or perceptual hash of the original file to that of the distributed file. Hence, cryptographic and perceptual hashes are unique for each data file and can be used as a criterion to check whether the content and its source copy are identical.

The same cryptographic or perceptual hash could be used to verify the authenticity of the content. A cryptographic or perceptual hash on a file is a "digital fingerprint" whereby even the smallest change to the file will cause the cryptographic or perceptual hash to change completely. Cryptographic or perceptual hashes are typically created using cryptographic techniques and can be generated using a range of readily available and open source tools. While cryptographic or perceptual hashes can be used to determine changes to the contents of a file, the specific changes are not specified.

In certain preferred embodiments, the system may be configured to use the cryptographic or perceptual hash to determine that a data file on the user's, consumer's, or receiver's end matches the original or authentic data file from the source. In another embodiment, the system is configured to use the cryptographic or perceptual hash to determine that a certain fixity has been maintained when storing certain data files. In yet another embodiment, the system is configured to use the cryptographic or perceptual hash to determine that a stored data file has been correctly delivered to the user.

The use of a cryptographic or perceptual hash also creates a chain of custody between those who produce or supply the digital materials, those responsible for its ongoing storage, and those who need to use the digital material that has been stored. In addition to the cryptographic or perceptual hash other metadata (or "meta data") can also be used to improve the efficiency of the system. Examples of other metadata include the length of a video clip (or the frame count), the aspect ratio, the frame rate, length, size, bitrate, and the like.

It is further contemplated that the system may use the metadata—alone or in addition to the cryptographic or perceptual hash—to authenticate the content. For example, the system may be configured to match the metadata of distributed video content with its original and confirm that the distributed video content is not manipulated in terms of its video content, audio, playback speed, or combinations of each, which are often modified in deepfakes. Use of these criteria could be used to identify which aspects of the content have been manipulated.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the present invention, where like designations denote like elements, and in which:

FIG. 7A illustrates an exemplary neural network that may be used to authenticate content;

FIG. 8C illustrates a screenshot of an exemplary authentication output;

FIG. 8D illustrates a screenshot of an exemplary authentication output;

FIG. 9E illustrates exemplary lines of code corresponding to the images uploaded by a content creator and third party user.

DETAILED DESCRIPTION OF THE INVENTION

Figure 1:
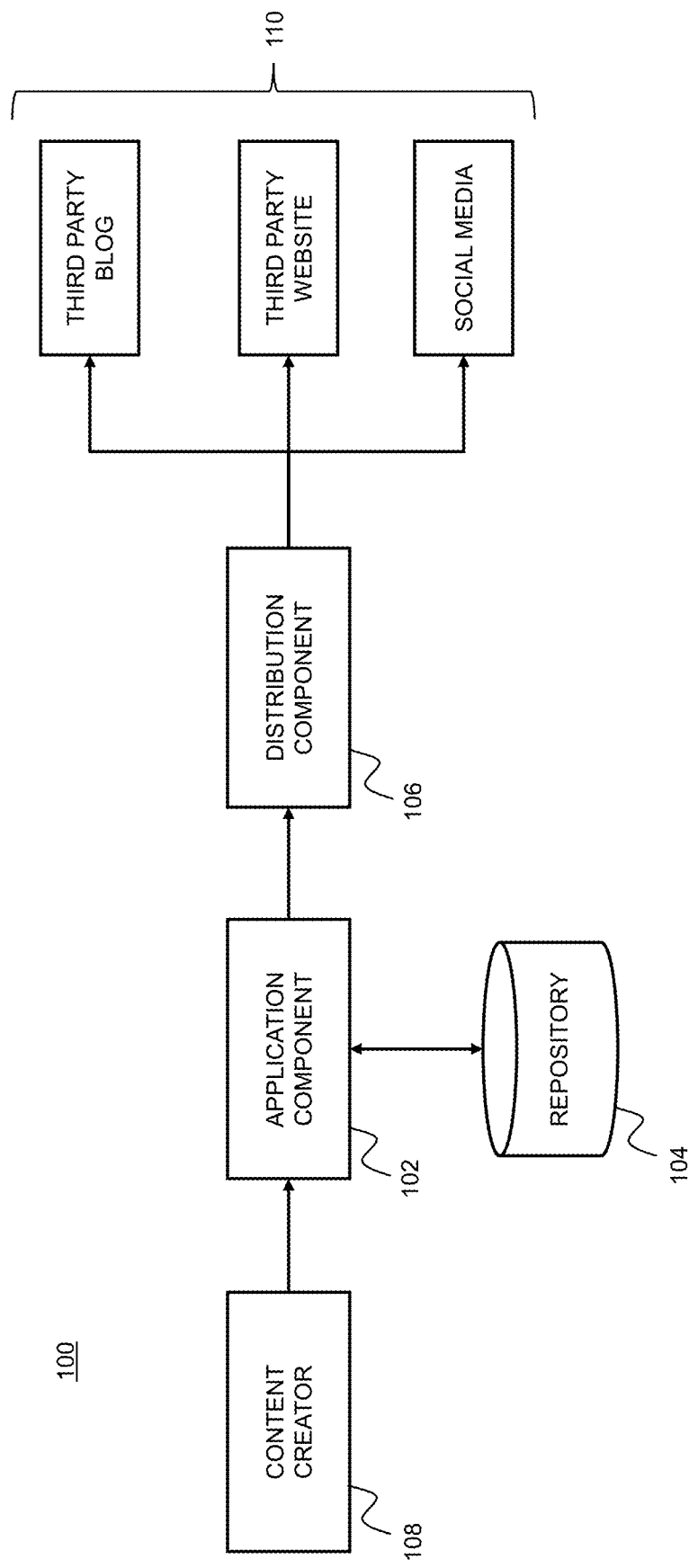
FIG. 1 illustrates an exemplary system that may be used to authenticate content.
Figure 2:
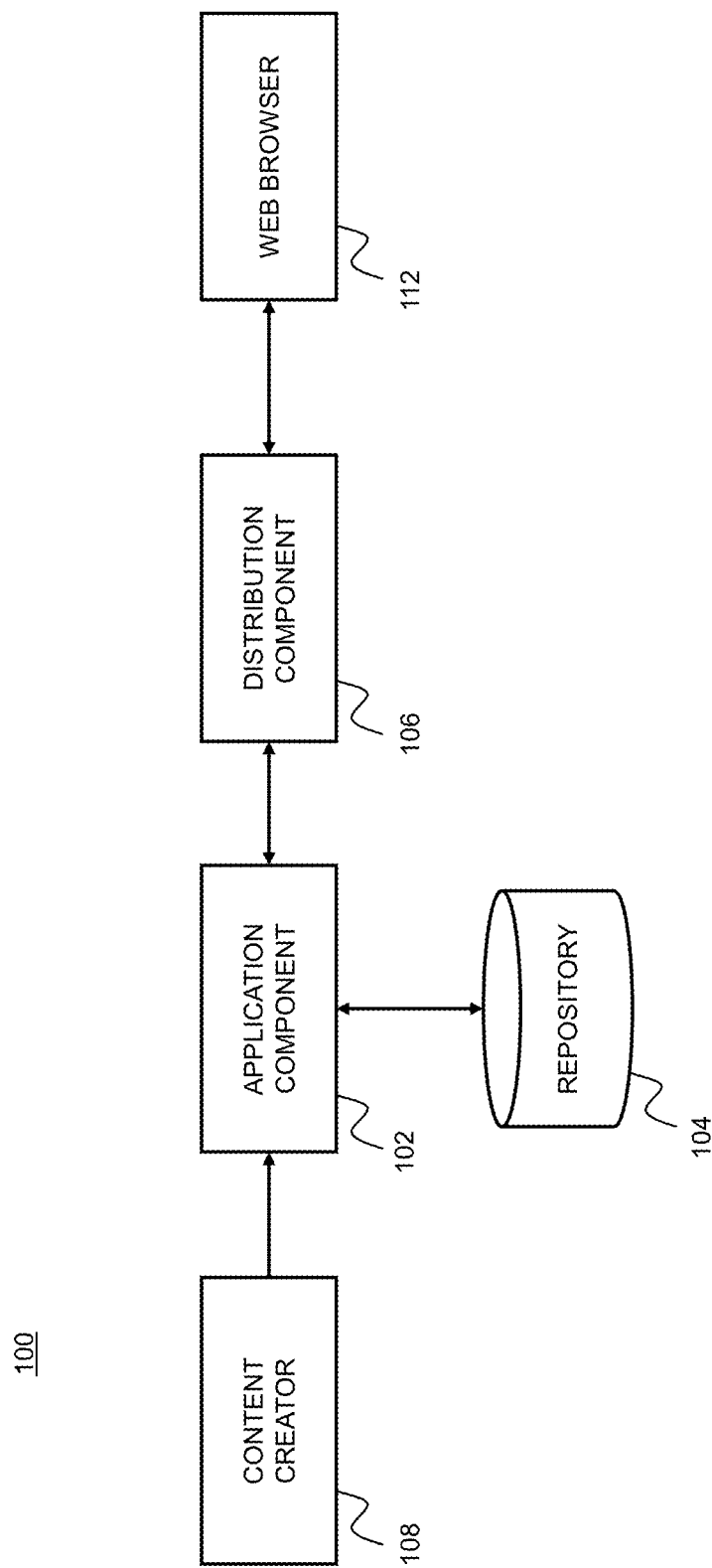
FIG. 2 illustrates an exemplary system that may be used to authenticate content.

Turning to the figures, FIG. 1 and FIG. 2 illustrate an exemplary system 100 including an application component 102, a repository component 104, and a distribution component 106. As shown, the application component 102 may obtain one or more units of content from a content creator 108. The system is configured to verify the integrity of the content creator 108, continuously monitor the content creator 108, and perform additional verifications.

The system 100 may verify each unit of content automatically or in response to a user input. In one instance, original content from a content creator 108 or owner is verified by an initial audit. The system 100 may be configured to audit the content creator's or owner's background as well as the content provided through a series of parameters. One example parameter may include a rating scale corresponding to the trustworthiness associated with the content creator 108 or owner and/or the content output by the content creator 108 or owner. Another example parameter may include determining whether the content creator is related to a source identified by the system as a trusted source.

In certain embodiments of the verification process, the system may be configured to assign a score or label to a content creator corresponding to their level of trustworthiness and/or reputation. For example, a green, yellow, or red label may be used to signify that a content creator is highly trusted, moderately trusted, or not trusted, respectively. In another example, content creators may be scored on a scale of 1-100, where 1 represents not trusted and 100 represented highly trusted.

The application component 102 of system 100 receives the content from content creator 108 and is configured to process the content to collect certain metadata. In particular, the application component 102 is responsible for processing the content, assigning a cryptographic or perceptual hash for the content, and collecting certain metadata for the content. The application component 102 may then use all or a portion of the collected metadata and/or an assigned cryptographic or perceptual hash as criterion for authentication purposes.

The processing step performed by the system 100 may include an analysis of the content to identify content variables. The system 100 may then use those variables to authenticate the content. In one instance, the system 100 may authenticate content by generating a cryptographic or perceptual hash using the content variable, as detailed below. Example variables that the system 100 may analyze include pixel count, resolution, file size, frame count, audio frequency mapping, and/or file type.

The system 100 may store the metadata and other information related to the content in a repository 104. The metadata stored in the repository 104 may, for example, be used by the application component 102 in response to an authentication request, as detailed below.

As shown in FIG. 1, once the application component 102 has processed and stored information relating to the content in the repository 104, the distribution component 106 may distribute the content to one or more third party platforms 110, such as blogs, websites, and/or social media. Through use of the system 100, the content creator 108 is audited and the distributed content is dynamically authenticated.

As shown in FIG. 2, the distribution component 106 may also distribute content received from a content creator 108 to a web browser 112. Through use of the system 100, a user of the web browser 112 may request an authentication of the content to be displayed. In response to the authentication request, the system 100 may collect metadata from the requested content to be displayed and use a hash function to calculate the cryptographic or perceptual hash for that content.

The system 100 is configured to compare the requested content's metadata and/or cryptographic or perceptual hash with the metadata and a cryptographic or perceptual hash of the original content collected from the content creator 108. If the metadata and the generated hash matches that of the original content, the request is authenticated.

The system 100 may generate a modal window, such as an inline frame—iframe—to distribute the content via the distribution component 106. An iframe may refer to an HTML element that allows one HTML document to be embedded inside another HTML document. Through the use of an iframe, the application component 102 may authenticate the content by matching the cryptographic or perceptual hash of content from the content creator or owner to the cryptographic or perceptual hash of the content rendered. The application component 102 may further authenticate the content by determining whether the metadata of the rendered content matches the metadata stored in the repository 104.

If the application component 102 determines that the cryptographic or perceptual hash, metadata, or combinations of each match those of the content creator 108 or owner, the distribution component 106 will deliver the content, for example, via the iframe. In particular, the system 100 or a content creators or owner's server may deliver the content in response to an API call from the iframe. In certain embodiments, the system 100 may display a field via a user interface to signify to the end user whether the content has been authenticated, such as by the application component 102. If the content is not authenticated, the field will not be enabled.

The system 100 is also configured to store pre-authenticated content. Pre-authenticated content can be efficiently distributed in the form of links and embed codes. For example, in response to a user engaging a link associated with pre-authenticated content, the system 100 is configured to request the content on behalf of the user and deliver that content for display on a user device. It is also contemplated that metadata, a visual representation that the content has been authenticated, and any other information related to the authentication may be output to the user in a user-readable format.

The system 100 is configured to render visual representation of a unit of content's authentication in one or more ways. In one example, the visual representation is displayed within an iframe tag that renders a visible message relating to the authenticity of the content. In another example, the visual representation is within a div layer that, for example, provides a message of authentication when the end user hovers over the displayed content with a mouse. In yet another example, the visual representation may be displayed according to the method or procedures of a specific platform.

Further, the application component 102 is configured to authenticate the content output on third party platforms 110. Examples of third party platforms 110 include Facebook and YouTube. When such a request is received by the system 100, the content including metadata will be forwarded to the application component 102. The application component 102 may then authenticate the content by comparing the cryptographic or perceptual hash, metadata, or combinations of content associated with the request to the authentic or original copy. In certain embodiments, the application component 102 may be configured to communicate instruction that enables the rendering of a field on third party platforms 110, to signal the authenticity of the content output to a user.

The system 100 also may include a second authentication layer for authenticating content output via the distribution component 110. For example, the content output to a user may include certain interactive elements. For purposes of this application, an interactive element refers to a watermark or a seal which is displayed to a user. The interactive element may signify the authenticity of the content. If the system 100 determines that the content is not authentic, the interactive element may signify that, such as through a negative response or text.

Figure 3:
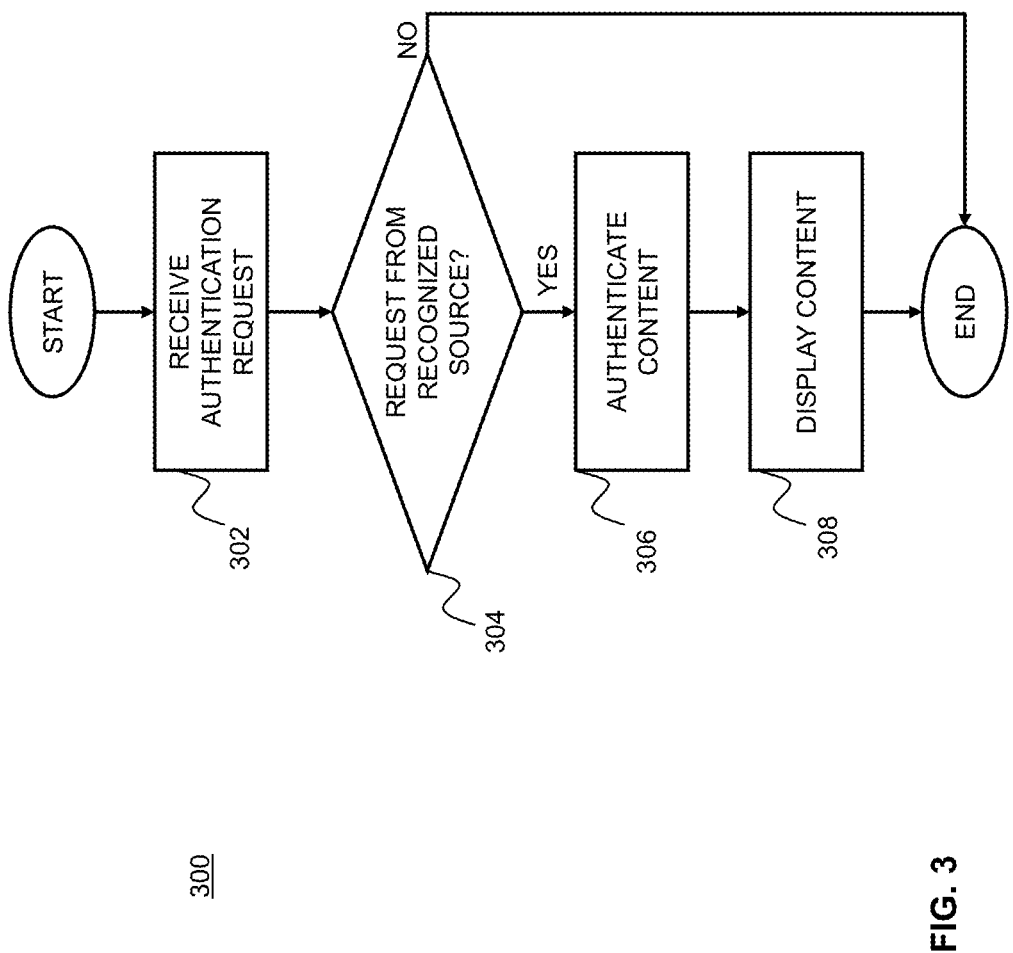
FIG. 3 is a flow chart illustrating an exemplary operation for authenticating content.

FIG. 3 is a flow chart 300 illustrating an exemplary operation of the system 100. As shown, the operation begins and at step 302 the system 100 may receive an authentication request, such as a user's interaction with the interactive element. At decision step 304, the system will determine whether the authentication request was received from a recognized source. If at step 304, the system 100 determines that the request is from an authorized source, at step 306, the system 100 will authenticate the content to confirm its authenticity. The authentication page will not load in response to certain attacks, such as spoofing. For example, an authentication mechanism may verify that the authentication page is requested from an iframe of the system 100 rather than via other requests—such as inputting a URL into a web browser—thereby restricting access to the authentication page via unapproved methods.

Once the content is authenticated, at step 308, the system 100 will display the content. For example, once the interactive element is triggered, the user may be redirected to an authentication page (or "landing page") of the system 100 or the content creator or owner, detailing the API request and the authenticity of the content, such as by demonstrating that the cryptographic or perceptual hashes match.

Figure 4:
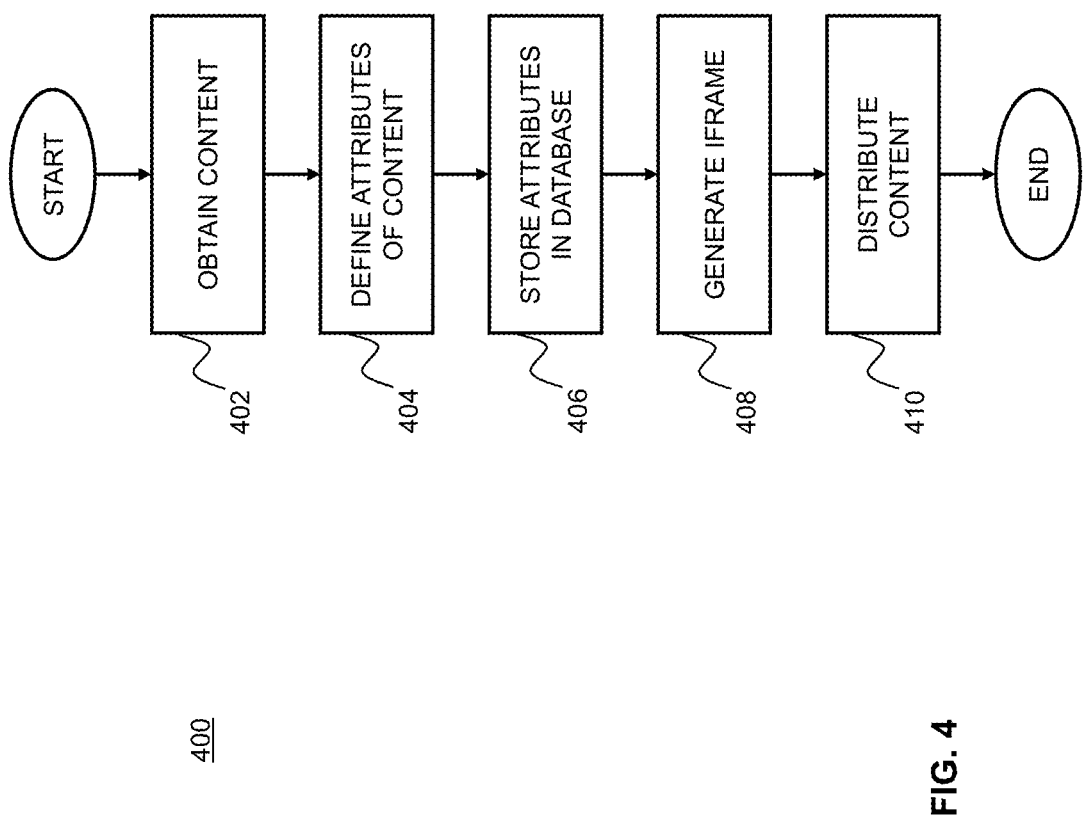
FIG. 4 is a flow chart illustrating an exemplary operation for video processing and distribution.
Figure 5:
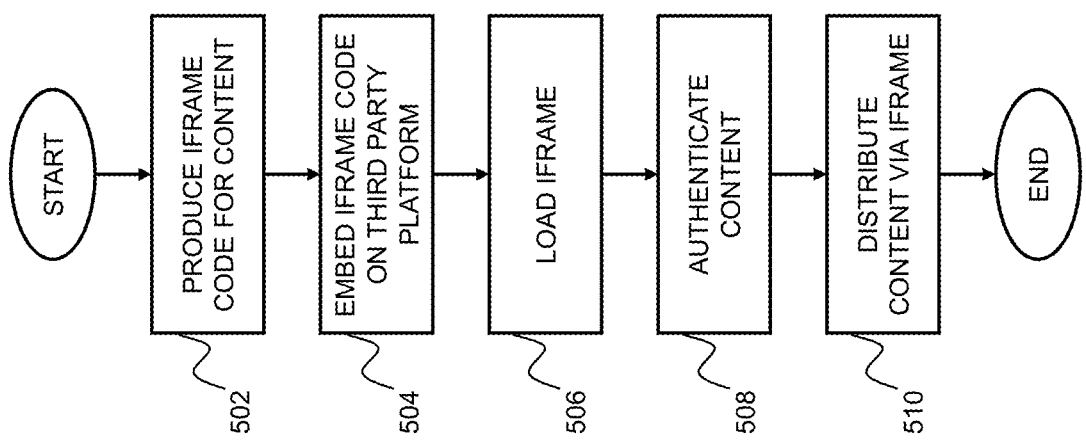
FIG. 5 is a flow chart illustrating an exemplary operation for embedding video content on third-party platforms.
Figure 6:
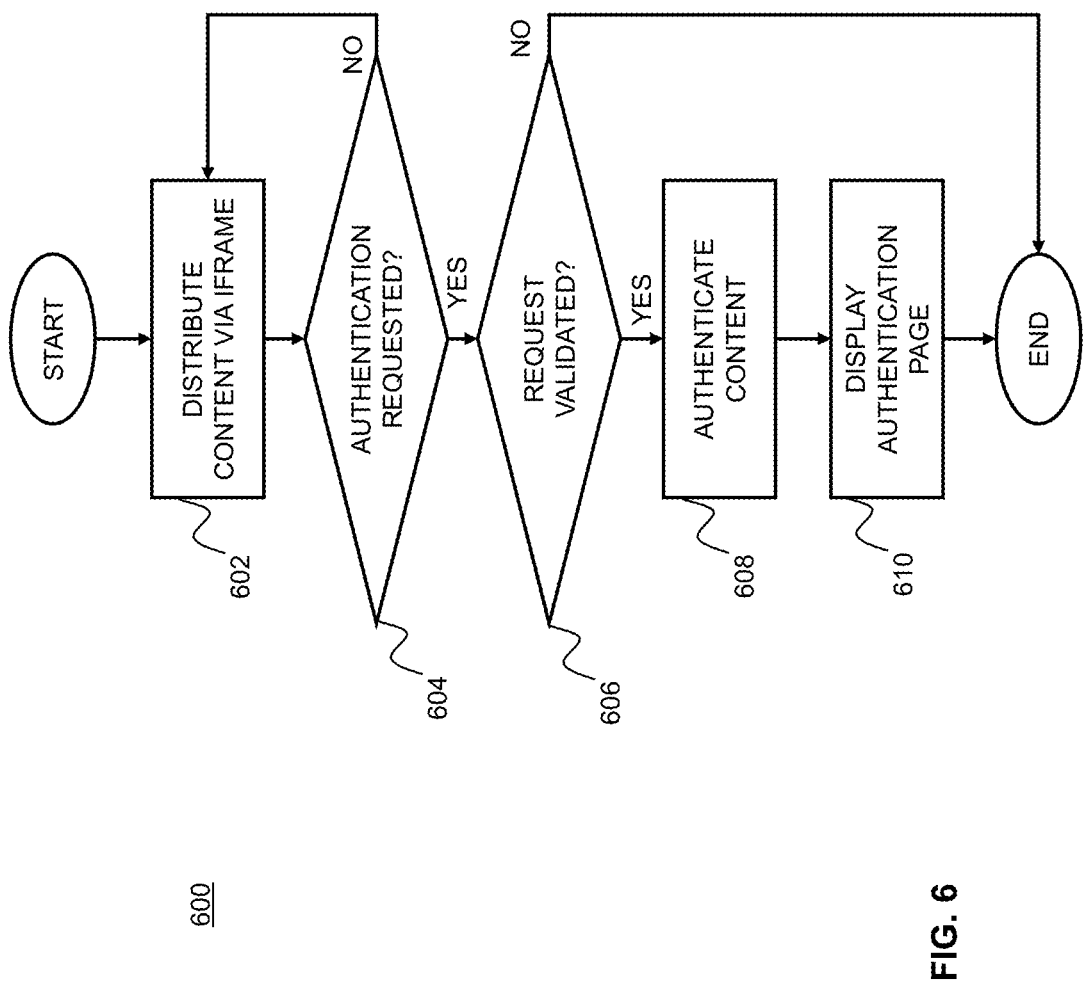
FIG. 6 is a flow chart illustrating an exemplary operation for reauthenticating content on demand.

FIG. 4, FIG. 5, and FIG. 6 illustrate exemplary operations of the system 100 for verifying the authenticity of videos from a trusted source, such as NBC News ("NBC"). In particular, the system 100 may authenticate the content to ensure that it is not altered, such as through technologies including deepfake.

FIG. 4 is a flow chart 400 illustrating an exemplary operation for video processing and distribution. The operation begins and, at step 402, the system 100 obtains content, such as a video produced and/or hosted by NBC or another trusted source. At step 404, the system 100 processes the content to define certain attributes corresponding to the video, such as metadata and a cryptographic or perceptual hash, which would be added to the video. One example of a cryptographic or perceptual hash is a checksum.

At step 406, the system 100 stores the metadata and checksum in a database, such as the repository mentioned above. At step 408, the system 100 generates an iframe, which the system 100 may host, which may be hosted on a website of the trusted source for distribution, or which may be rendered on a third-party platform.

At step 410, the system 100 can distribute the content via the iframe. For example, the iframe may provide an API call, which may be triggered when the video is loaded, for authentication to determine whether the video has been altered or manipulated. The iframe may also facilitate access to the video, which is embedded and displayed through the iframe. In addition, the iframe may include an interactive element for trust and verification purposes. The interactive element may be displayed to a user and used to reauthenticate the video to determine that the iframe is not faked.

FIG. 5 is a flow chart 500 illustrating an exemplary operation for embedding video content on third-party platforms, including blogs and websites. The operation begins and at step 502, the system 100 produces an iframe code corresponding to a specific piece of content. At step 504, the iframe code is embedded on a third party platform. It is contemplated that any blog or website could use the iframe code, which may be distributed by the system or another trusted source. For example, the publisher of a third-party website may embed the iframe code on their website such that a user may then access NBC's authenticated content displayed through the iframe.

At step 506, the iframe will load and trigger an API. At step 508, the API call may authenticate the content on the third party platform by matching the content's cryptographic or perceptual hash (in this example, a checksum) and metadata to that of NBC's original, authenticated content. At step 510, if the content is authenticated, the video will be displayed to a user along with an interactive element via the iframe, through the use of which, the user could reauthenticate the content to ensure that the iframe itself is not faked.

FIG. 6 is a flow chart 600 illustrating an exemplary operation for reauthenticating content on demand. The operation begins and at step 602, as mentioned above with reference to FIG. 5, the system distributes the video content to a user via an iframe. At decision step 604, the system will determine whether the user has requested authentication of the content. For example, the user may click on an interactive element of the iframe to make sure that the iframe is not spoofed. If authentication is not requested at step 604, the operation will revert back to step 602 and continue to distribute the content via the iframe.

If at decision step 604, an authentication request is received, at decision step 606, the system 100 will determine whether the request is validated. For example, the system 100 will determine whether a user engaged an interactive element of the iframe to trigger the API call or if the request came from a component of the system 100, such as the application component 102. If the request is validated, at step 608, the system 100 will reauthenticate the video in the iframe source using the cryptographic or perceptual hash and metadata. Once authenticated, at step 610, the system will display an authentication page to the user, such as via NBC's website, including the video and additional information to confirm the authenticity of the video.

If, at decision step 606, the system 100 determines that the API call is not validated, the system 100 will not display the authentication page. For example, if an attempt is made to access the authentication page using the URL, the system 100 will prohibit access to the authentication page. It is contemplated that this process may ensure that the iframe and interactive elements are not spoofed and, as a result, ensure the video content, as distributed, is not altered using any current or future manipulation techniques, such as deepfake.

Exemplary Neural Network

FIG. 7A illustrates an exemplary neural network 700 that may be used to implement all or a portion of the methods according to the present invention. Specifically, the neural network 700 can be used to determine whether content is authentic.

As shown, content 702 is first segmented into portions of data—for example pixel data—and input into a first layer 704—an input layer. Each layer in the neural network 700 is made up of neurons 706 that have learnable weights and biases. The middle layers—for example, 708 and 710—are termed "hidden layers." Each hidden layer is fully connected to all neurons in the first input layer 704. The neurons in each single layer of the hidden layers 708, 710 function completely independently and do not share any connections. The last fully-connected layer 812 is termed the "output layer" and may represent an identified structured data element. In certain embodiments, the neural network 700 may be positioned between any two layers of a convolutional neural network such that the output layer 812 acts as an input into another layer of a neural network.

In this embodiment, the hidden layers 708, 710 neurons include a set of learnable filters which can process portions of received content 702. As the content is processed across each filter, dot products are computed between the entries of the filter and the content 702 to produce an activation map that gives the responses of that filter to the content 702. The neural network 700 will learn filters that activate when they detect that the content is authenticated.

Figure 7B:
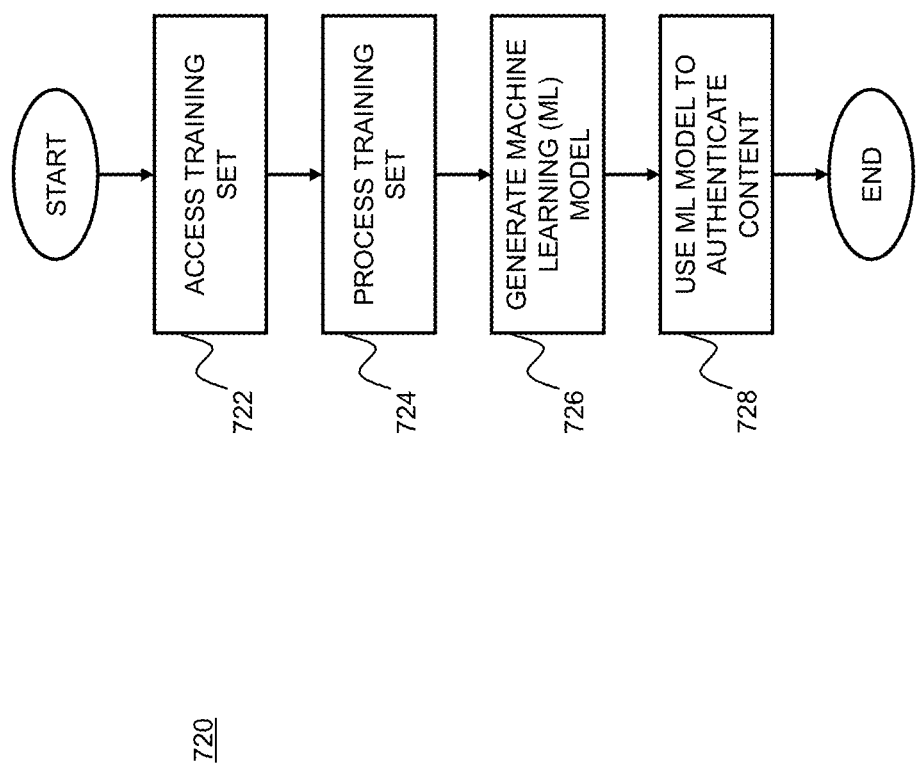
FIG. 7B is a flow chart illustrating an exemplary operation for using a neural network to authenticate content.

FIG. 7B is a flow chart 720 illustrating an exemplary operation for using a neural network 700 to authenticate content. The operation begins and at step 722, the system accesses a training data set including content. In particular, the training data set includes a large number of original content units along with several variations of that content including minor changes, for example, to characteristics, such as resolution, size, length, and format. At step 724, the system may process the set of content through the neural network 700 to, for example, train the learnable weights and biases of the network. In step 726, the system may generate a machine learning model that is configured to identify patterns in content with minor variations to characteristics. In step 728, the system may use the machine learning model to authenticate content.

In certain embodiments, the machine learning model may be trained to identify the unmanipulated versions of content having minor changes to its characteristics without changing the essence of the content itself. One example of this would be a compressed version of the image with no changes made to the actual image content. After the algorithm is fed with the training set it will recognize patterns which are then used to authenticate content that has been converted but unmanipulated.

Exemplary Backend Authentication Process

Figure 8A:
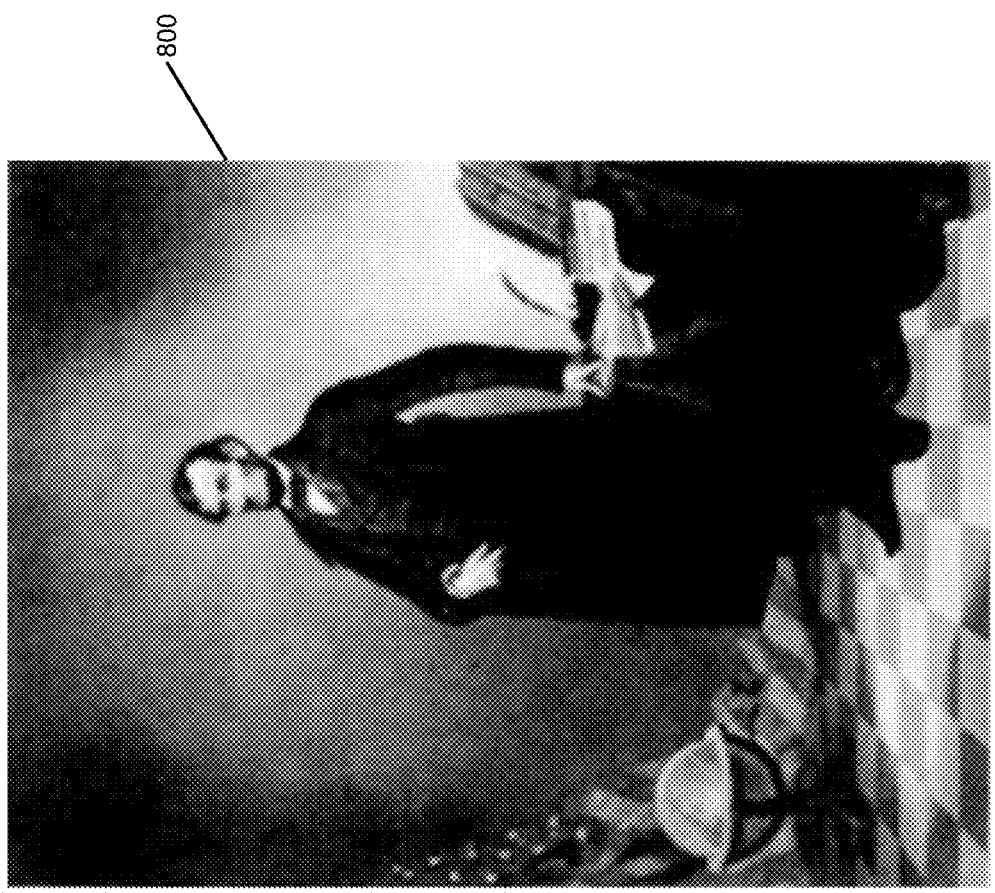
FIG. 8A illustrates an exemplary image that the system may receive from a content creator.

FIG. 8A illustrates an exemplary image 800 that the system 100 can authenticate. In operation, the system 100 will obtain this image from a content creator or owner. The system 100 may then analyze the image 800 to collect metadata and generate a cryptographic or perceptual hash associated with the image 800. That information is stored in a database of, for example, a web application from the content creator or owner.

Figure 8B:
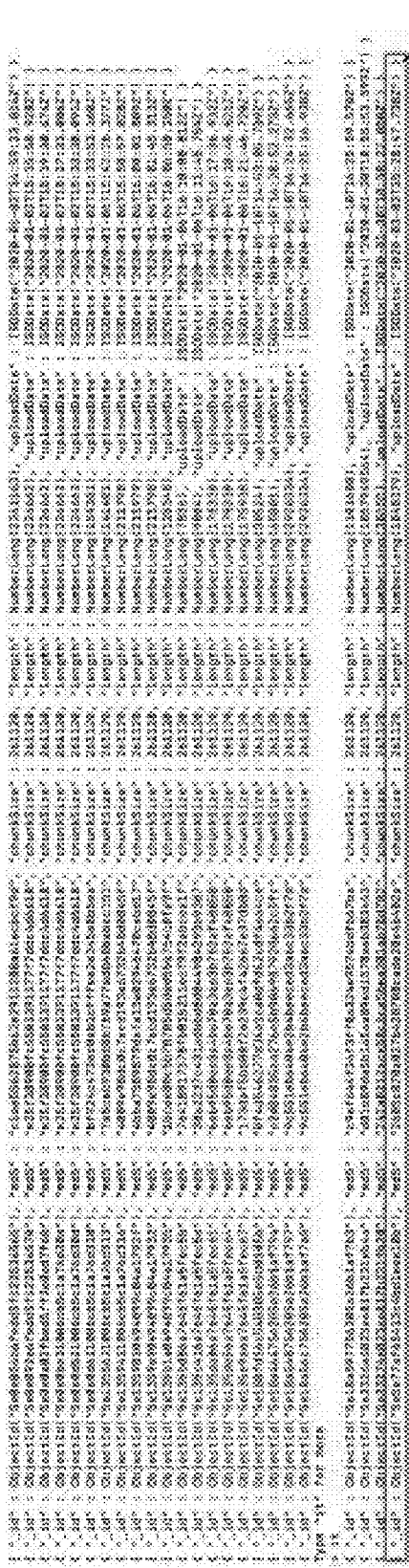
FIG. 8B illustrates a screenshot of an exemplary database entry.

FIG. 8B illustrates a screenshot 802 of the information 804 collected and associated with the image. As shown, the following information 804 is stored:

ObjectId("5e5e77af65413c4bd1eee10b") is the internal unique identifier given to the object within the database;

"md5": "2605c870a027b428708cade20e4b402a" is the generated cryptographic hash;

"chunkSize": 261120, "length": NumberLong(1048379) is the size of the image (i.e., the metadata); and "uploadDate": ISODate("2020-03-03T15:28:47.738Z") is the date the image was uploaded.

The cryptographic or perceptual hash and metadata will remain unchanged if the same image is uploaded from multiple sources. In certain preferred embodiments, the system 100 will create a new entry in the database when the image is uploaded multiple times. The new entry will have a new unique identifier. Since the unique identifier is not used during authentication, the system will not detect a conflict if more than one unique identifier exists for a unit of content having the same cryptographic or perceptual hash and metadata.

The system 100 may then authenticate other images uploaded to the web application for verification. In particular, the system 100 will determine whether the uploaded image's metadata and cryptographic or perceptual hash match those of an entry in the database. If they do match, the system will authenticate the uploaded image, as shown by the term "true" of output 806 of in FIG. 8C. If they do not match, the system will detect the fake as shown by the term "false" of output 808 in FIG. 8D.

As discussed above, other metadata will be delivered to the requesting platform that the system 100 may use to, for example, build the iframe's authentication on demand upon clicking the interactive element.

In addition to technical metadata, such as size, bitrate, and frames per second, that is generated when content is processed, the system is configured to collect other metadata from the content creator or owner to give a context to the content. For example, additional metadata that the system may collect includes date and time of the content creation, location at which the content is created, author or content creator's name, short summary or description of the content, and the name of the publisher or owner of the content (e.g., NBC).

While the system may not use this collected metadata for authentication, all or a portion of the metadata may be distributed along with the content, for example, through an iframe or as an object to be rendered or delivered along with the content, to provide additional information about the content to users.

In addition to the standard cryptographic hash functions which recognize the slightest changes to content, the system may use its own perceptual hash functions to authenticate content which has been slightly changed. For example, the system may authenticate content by determining that the length of the content was trimmed, the content was compressed, the format has changed and the like. This perceptual hash function would utilize the wide range of metadata extracted from the content when it is collected from the content creator or owner.

In certain embodiments, the system may use audio fingerprinting to authenticate audio content by recognizing any changes made to, for example, an audio track, even if the format or size has been changed. Further, the system may be configured to use audio fingerprinting to authenticate video content and identify altered videos where the video component is original but the audio component has been altered.

Exemplary Backend Authentication Process

Figure 9A:
FIG. 9A illustrates exemplary images that are uploaded to the system for authentication.
Figure 9A:
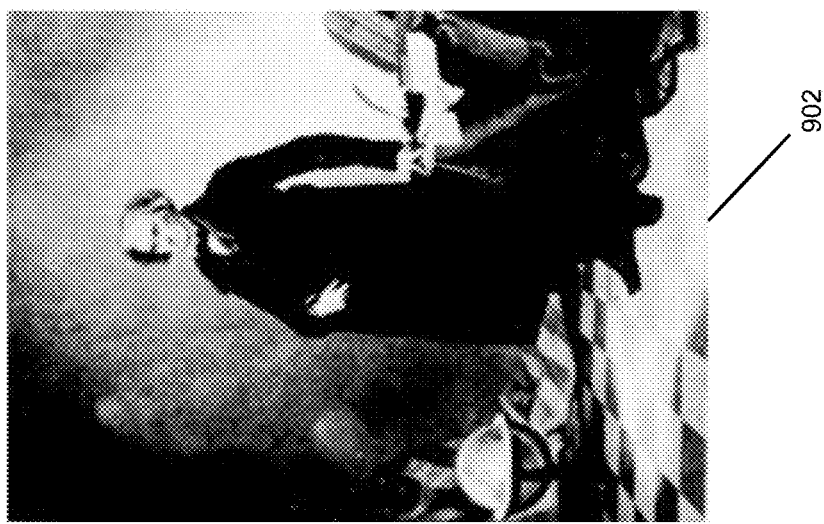

FIG. 9A illustrates an original image 902 and an altered image 904. Specifically, the original image 902 on the left is of South Carolina politician John Calhoun which is received from a content creator or owner. The altered image 904 on the right labeled depicts Abraham Lincoln's head placed atop John Calhoun's body.

Figures 9B, 9C:
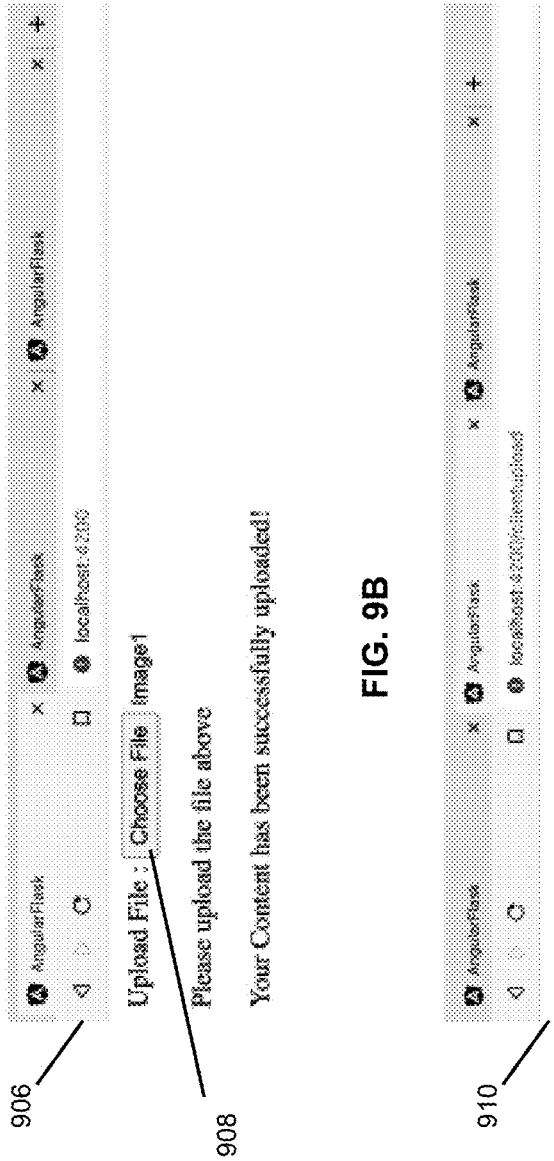
FIG. 9B illustrates an exemplary user interface for use by a content creator.
FIG. 9C illustrates an exemplary user interface for use by a third party user.

FIG. 9B illustrates a screenshot of a user interface 906 for use by a content creator. As shown, a content creator or owner may upload the original image 902 via the user interface 906 by selecting the "Choose File" button 908. Once the content creator or owner uploads the original image 902 to the system, the metadata of that image 902 and a unique cryptographic or perceptual hash are generated. This metadata and the unique hash are stored in a database accessible to the system and can later be used for authentication.

For example, there may exist a partnered social media platform where by images uploaded are automatically authenticated by matching hash and metadata of the uploaded images to the hash and metadata of original images, which may be stored as entries in a database. When a user of the partnered social media platform uploads a previously authenticated image from a trusted source, the system may authenticate the image by comparing its generated hash and metadata with those of the source content. If the compared information is identical, the system would authenticate the image. If there is no match, the system may determine that the match is not authenticated. In either case, the system may be configured to display text or a graphical representation in response to determining whether the image is authentic or not.

FIG. 9C illustrates a screenshot of a user interface 910 for use by a third party (i.e., not a content creator or owner) to authenticate an image. As shown, the third party may upload an image via the "Choose File" button 912 to authenticate it as identical to original image 902. Once uploaded, the system will compare the hash and metadata of the uploaded image with the hashes and metadata of images accessible to the system.

Figure 9D:
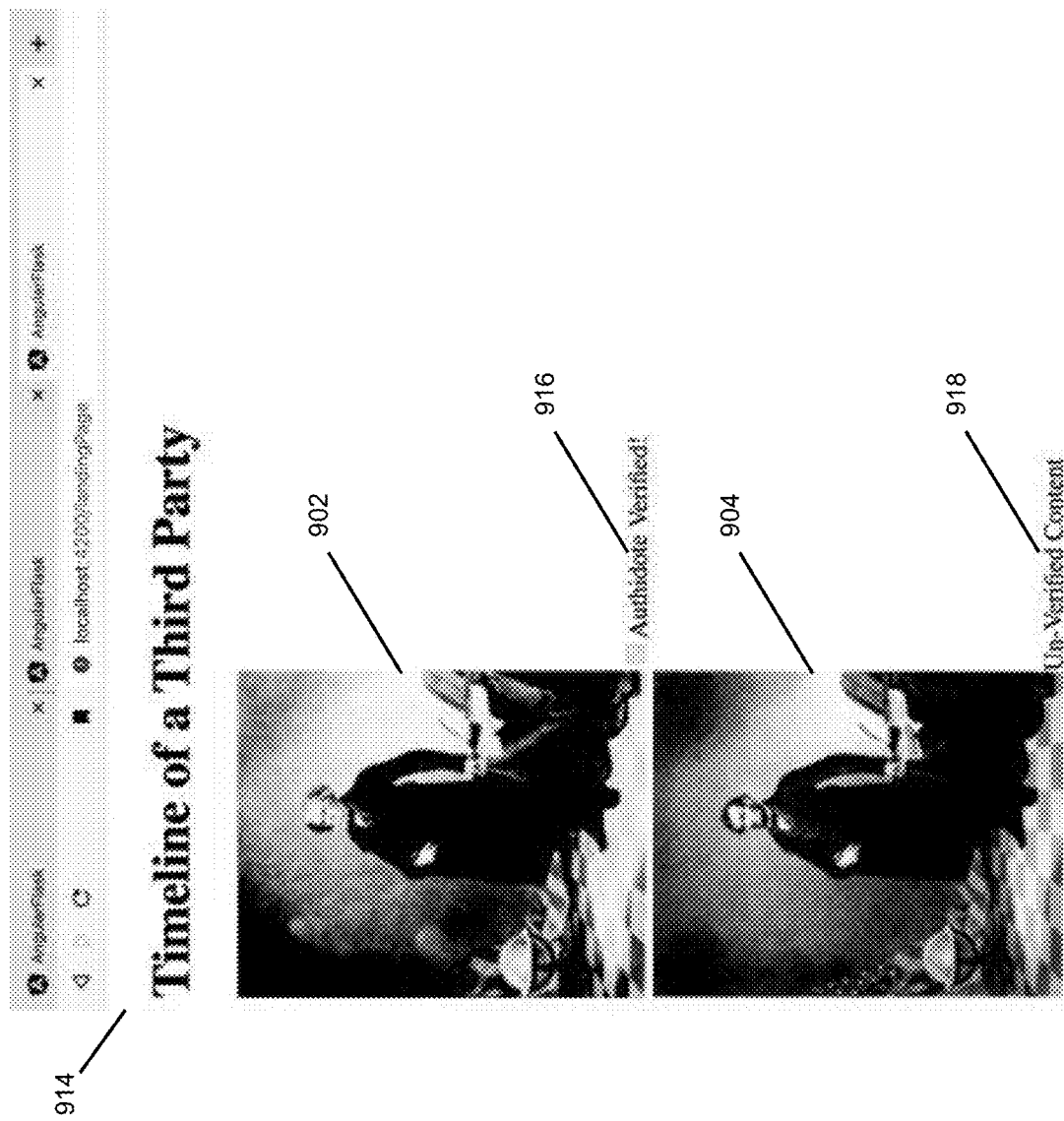
FIG. 9D illustrates an exemplary output of the system in response to an authentication request.

FIG. 9D illustrates a screenshot of an output screen 914. The output screen 914 may include the uploaded image and a determination regarding the validity of that image. As shown, if the image uploaded by a third party user is identical to the original image 902, the system will determine that the hash and the metadata match those of a database entry, and output text and a graphical component 916 confirming that the uploaded image is authentic. As further shown, if the altered image 904 is uploaded by a third party user, the system will determine that the hash and the metadata fail to match a database entry, and output text 918 conveying that the altered image 904 is not authentic.

Figure 9E:
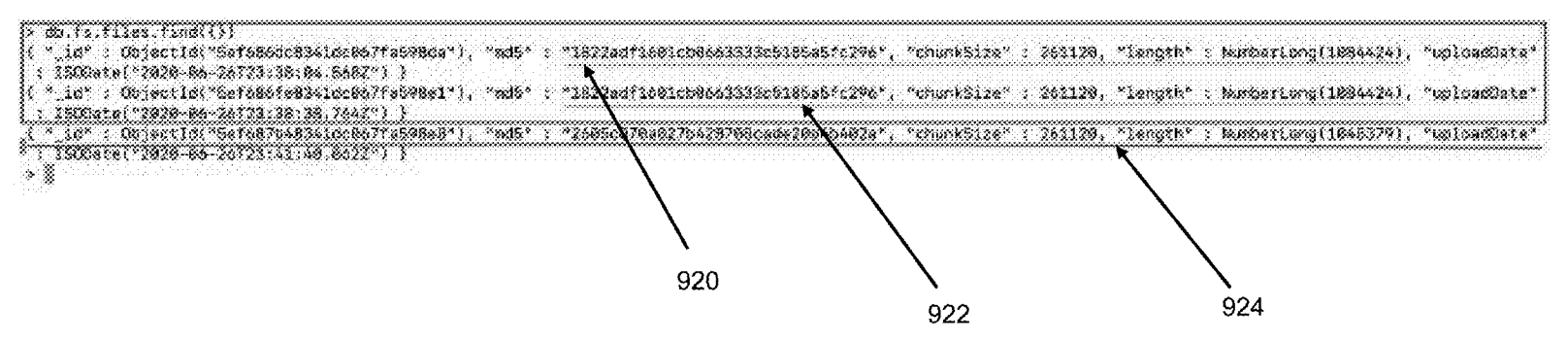

FIG. 9E illustrates a screenshot of code corresponding to the images uploaded above. As shown in the first line 920, once the original image 902 is uploaded, the system is configured to generate a hash and capture metadata corresponding to that original image 902. As shown in the second line 922, the system is configured to receive an identical image from a third party user and generate a hash and capture metadata that match the hash and metadata of the original image 902. As shown in the third line 924, the system is configured to receive an altered image 904 from a third party user and generate a hash and capture metadata that fails to match with the hash and metadata of the original image 902.

The system may recognize the slightest changes made to an image —such as resolution or size—to determine whether an image is authentic or not. In certain embodiments, the system will authenticate content when the generated cryptographic hashes are exact matches. In certain embodiments, where a unit of content's format or size has been changed, but otherwise the content of the unit has not otherwise been manipulated, the system may use a perceptual hash and machine-learning algorithms to authenticate the content, as detailed above. The methods described herein will be used to authenticate various types of content such as image, video, audio, documents, and text.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system for authenticating content comprising:
a processor;
a non-volatile, non-transitory memory in communication with the processor via a communication infrastructure, said memory including stored instructions that, when executed by said processor, cause said processor to:
verifying that content is from a trusted source, wherein said trusted source is verified via an audit;
analyze the content to define one or more attributes corresponding to the content, wherein said one or more attributes is metadata including at least one variable associated with the content;
generate a modal window, said modal window including the content and the one or more attributes;
distribute the content through use of the modal window; and
authenticate, in response to a request via the modal window, the distributed contents, wherein said modal window is an inline frame including an interactive element corresponding to an authentication of the distributed content.

2. The analyzing step of claim 1, wherein the attribute is defined using a cryptographic hash function of a fixed length.

3. The analyzing step of claim 1, wherein the attribute is defined using a perceptual hash function.

4. The analyzing step of claim 1, wherein the attribute is defined based on audio fingerprinting.

5. The analyzing step of claim 1, wherein the attribute is defined by applying a checksum algorithm to the content.

6. The authenticating step of claim 1, wherein the processor is further operative to determine whether the one or more attributes of the content match to one or more attributes of the distributed content.

7. The system of claim 1, wherein said interactive element is at least one of a watermark and a seal.

8. The system of claim 1, wherein the interactive element corresponds to a trustworthiness associated with the trusted source.

9. The system of claim 1, wherein said processor is further configured to:
locate a data set containing content, wherein the set includes original content and variations of the original content; and
process the data set using a machine learning algorithm to produce a machine learning model to identify minor changes to content characteristics.

10. A method for authenticating content comprising:
verifying content is from a trusted source, wherein said trusted source is verified via an audit;
analyzing content to define one or more attributes corresponding to the content, wherein said one or more attributes is metadata including at least one variable associated with the content;
generating a modal window, said modal window including the content and the one or more attributes;
distributing the content through use of the modal window; and
authenticating, in response to a request via the modal window, the distributed content, wherein said modal window is an inline frame further including an interactive element corresponding to an authentication of the distributed content.

11. The analyzing step of claim 10, wherein the attribute is defined using at least one of a cryptographic hash, perceptual hash, and audio fingerprinting.

12. The analyzing step of claim 10, wherein the attribute is metadata, wherein the metadata corresponds to at least one of pixel count, resolution, file size, frame count, audio frequency mapping, and file type.

13. The authenticating step of claim 10, further comprising determining whether the one or more attributes of the content match to one or more attributes of the distributed content.

14. The method of claim 10, wherein the modal window further includes at least one of a watermark and a seal corresponding to a trustworthiness of the trusted source.

15. The method of claim 10, further comprising:
locating a data set containing content, wherein the set includes original content and variations of the original content; and
processing the data set using a machine learning algorithm to produce a machine learning model to identify minor changes to content characteristics.

* * * * *